United States Patent

[11] 3,570,372

| [72] | Inventor | John F. Campbell<br>Beech Knoll, Timberidge Trail, Gates Mills,<br>Ohio 44040 |
|---|---|---|
| [21] | Appl. No. | 779,851 |
| [22] | Filed | Nov. 29, 1968 |
| [45] | Patented | Mar. 16, 1971 |

[54] RADIAL PUMP WITH HYDROSTATIC LOAD BALANCE
9 Claims, 4 Drawing Figs.

[52] U.S. Cl. .................................................. 91/496, 92/157
[51] Int. Cl. .................................................. F04b 27/08, F01b 31/10
[50] Field of Search ........................................ 103/174; 308/122; 230/187; 91/496, 488; 92/157

[56] References Cited
UNITED STATES PATENTS

| 585,445 | 6/1897 | Lumb | 308/122 |
| 824,187 | 6/1906 | Lowe | 308/122 |
| 1,185,571 | 5/1916 | Abbott, Jr. | 308/122 |
| 2,742,883 | 4/1956 | Smith | 92/157 |
| 3,354,786 | 11/1967 | Bedford | 92/157 |
| 2,347,663 | 5/1944 | Carnahan | 103/174 |
| 2,463,638 | 3/1949 | Naylor | 103/174 |
| 2,372,523 | 3/1945 | Sinclair | 103/134 |
| 2,449,297 | 9/1948 | Hoffer | 308/122 |
| 2,968,287 | 1/1961 | Creighton | 103/174 |
| 3,188,973 | 6/1965 | Firth et al. | 103/174 |

FOREIGN PATENTS

| 459,578 | 9/1935 | Great Britain | 103/174 |

*Primary Examiner*—William L. Freeh
*Attorney*—Oberlin, Maky, Donnelly & Renner

ABSTRACT: A radial pump having radial plungers which are reciprocated radially inwardly and outwardly by an eccentric on the input or drive shaft. Fluid pressure from the pumping chambers is fed to associated recesses at the face of the eccentric in radial alignment with each plunger to provide a hydrostatic load balance on each plunger at the eccentric face, whereby transfer of force from the eccentric to the plungers occurs primarily through the static fluid within the recesses. Fluid pressure is also fed from the pumping chambers to additional recesses in the journal bearings for the input shaft radially opposite the plungers to provide a hydrostatic load balance on the input shaft.

INVENTOR
JOHN F. CAMPBELL
BY
Oberlin, Maky, Donnelly & Renner
ATTORNEYS

Patented March 16, 1971

INVENTOR
JOHN F. CAMPBELL

BY
Oberlin, Maky, Donnelly & Renner
ATTORNEYS

3,570,372

RADIAL PUMP WITH HYDROSTATIC LOAD BALANCE

BACKGROUND OF THE INVENTION

The present invention relates generally as indicated to a radial pump with hydrostatic load balance to provide extremely low operating friction between the radial plungers of the pump and the pump input or drive shaft, and also at the journal bearings for the input shaft.

The required static torque input of a conventional radial pump is primarily dependent upon the magnitude of the pressure of the fluid being pumped and the the amount of friction on the input shaft both at the connections between the input shaft and pump plungers and at the shaft journals. At current maximum pumping pressures, such friction may be kept to a minimum by employing suitable antifriction bearings between the plungers and input shaft and at the shaft journals, as shown, for example, in U.S. Pat. No. 3,247,800, granted to John F. Campbell on Apr. 26, 1966. However, it is anticipated that future pump pressure requirements may be three times greater than current maximum pressures or more for operating such devices as high-speed fluid motors for trucks and the like, and the usual antifriction bearings are not suitable for eliminating friction at such extremely high pressures because very large size bearings would be required to carry the high pumping pressures and such large size bearings do not have the required r.p.m. ratings. Present day large size bearings are rated at only about 1,700 r.p.m., whereas as much as 4,500 r.p.m. may be required to produce the extremely high pumping pressures needed. Moreover, the low-viscosity oils that are necessary for cold operation of pumps have insufficient film strength at high temperatures to achieve adequate antifriction bearing life. In addition, such large antifriction bearings are too costly, and also too large to achieve a compact pump design.

SUMMARY OF THE INVENTION

It is accordingly a principal object of this invention to provide a low-cost radial pump capable of producing substantially greater pressures at higher pump shaft r.p.m. than obtainable with previous known radial pump designs.

Another object is to provide such a radial pump which is relatively lightweight and has a high input-to-output efficiency.

These and other objects of the present invention may be achieved by providing a radial pump with fluid pressure recesses at the outer face of the pump eccentric in radial alignment with the associated radial plungers. Such recesses are of substantially the same area as the radial plungers and are in fluid communication with the associated pumping chambers to achieve a hydrostatic load balance on each plunger regardless of the magnitude of pressure in the pumping chambers. Accordingly, the transfer of force from the input shaft to the plungers will occur substantially only through the static fluid in the recesses which produces very little friction. Additional recesses may be located in the journal bearings for the input shaft radially opposite the plungers and in communication with the pumping chambers to provide a hydrostatic load balance on the input shaft.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

DESCRIPTION OF THE PREFERRED EMBODIMENT

Figures 1, 2:
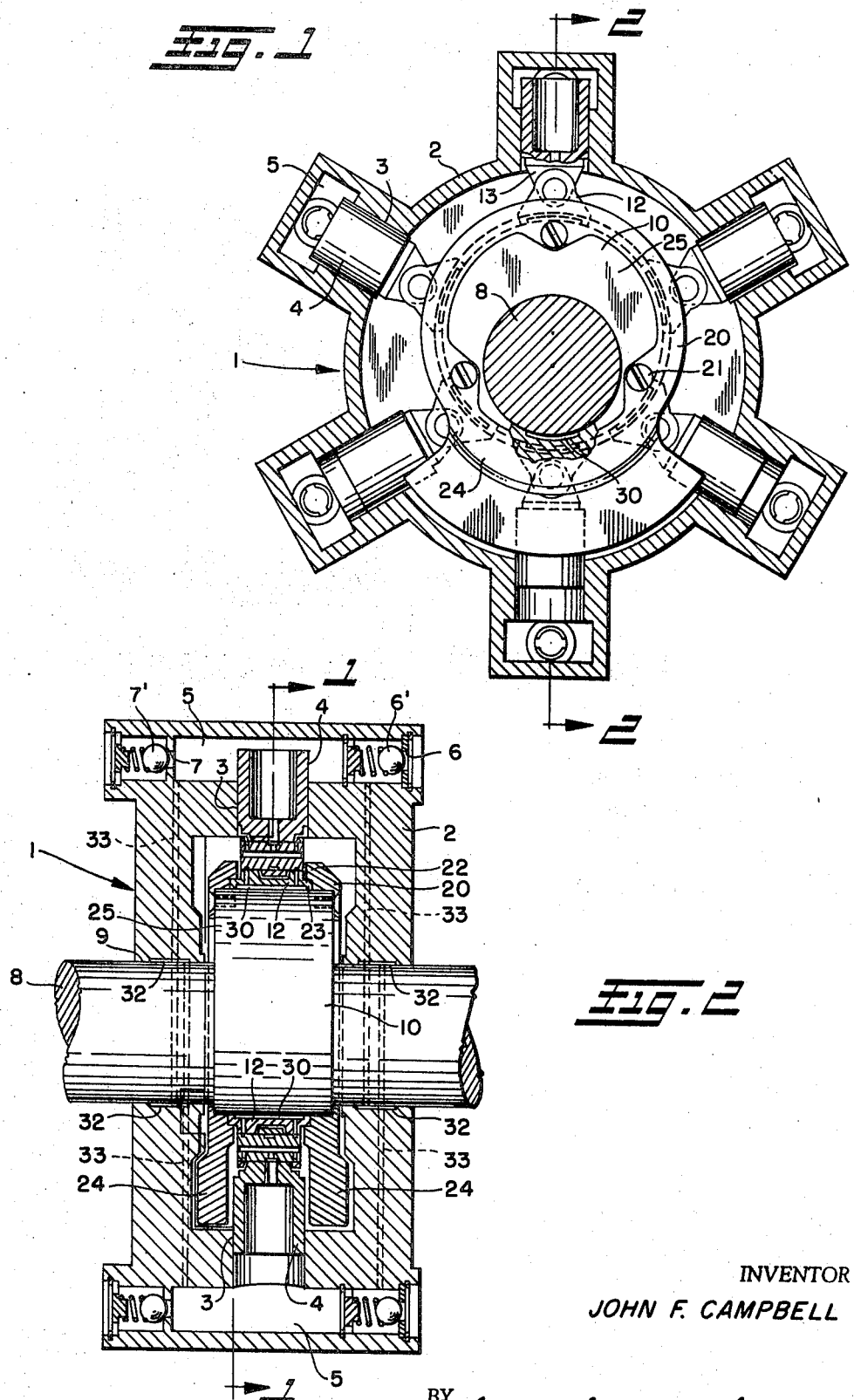
FIG. 1 is a transverse section through a preferred form of radial pump in accordance with this invention showing the drive connections between the radial plungers and the eccentric drive therefor, taken on he plane of the line 1-1 of FIG. 2.
FIG. 2 is a fragmentary longitudinal section through the pump of FIG. 1, taken on the plane of the line 2-2 thereof.

In FIGS. 1 and 2 there is shown a preferred from of radial pump 1 constructed in accordance with this invention which generally comprises a main housing 2 having a plurality of circumferentially spaced radial bores 3 each containing a radially movable plunger 4. While six such radial bores 3 and plungers 4 are shown, it will be apparent that one or any other suitable number may be provided. Each bore 3 communicates with a pumping chamber 5 at its outer end having an inlet port 6 containing a check valve 6' through which fluid is drawn into the pumping chamber 5 during radial inward movement of the associated plunger 4 and a delivery port 7 containing a check valve 7' through which fluid is pumped under pressure during the outward pumping stroke of the plunger 4.

Such radial inward and outward movement of the plungers 4 is achieved by rotation of an input shaft 8 journaled in a central longitudinal bore 9 in the main housing 2. The input shaft 8 is adapted to be coupled to the output of a prime mover which may be an electric motor, gas turbine, or diesel or gas engine, etc. Fixed to the input shaft 8 within the housing 2 interior is a cam or eccentric portion 10 having sliding contact with slipper bearings 12 pivotally connected to the inner ends 13 of the plungers 4. As best seen in the fragmentary enlargements of FIGS. 3 and 4, the inner end 13 of each plunger 4 is of reduced section for receipt in a clevis portion 14 on each slipper bearing 12, and there are aligned openings 15 and 16 through the inner end of each plunger 4 and associated clevis 14 through which a link pin 18 is inserted to retain these parts together.

At present day pump speeds, a spring return such as shown in the aforementioned U.S. Pat. No. 3,247,800 may be used to maintain the radial plungers in contact with the eccentric 10. However, at the high speeds for which this pump is designed to operate, it is preferred that the slipper bearings 12 be retained in close relation to the eccentric 10 by slipper retention plates 20 secured to opposite ends of the eccentric 10 by screws 21 or the like and having inwardly extending rim portions 22 overlying outwardly extending shoulder portions 23 on the slipper bearings. Accordingly, during each revolution of the shaft, the plunger is moved radially outwardly and inwardly by the eccentric 10 and slipper retention plates 20 to pump fluid. The rim portions 22 also desirably extend radially outwardly beyond the ends of the link pins 18 to retain them in place. Such slipper retention plates 20 may have an enlarged mass 24 radially opposite the outermost portion 25 of the eccentric 10 as shown in FIGS. 1 and 2 to counterbalance the eccentric.

In the radial pump design shown in U.S. Pat. No. 3,247,800, both the eccentric portion of the input shaft and the input shaft itself are journaled in antifriction bearings which have proven to be very effective in eliminating friction at current maximum pump pressures. However, as previously mentioned, to develop substantially higher pumping pressures, very large size bearings would be required, which are too costly and too large for a compact pump design. Moreover, the r.p.m. ratings for such large size bearings are too low, and the low-viscosity oils necessary for cold operation of the pump have insufficient film strength at high temperatures to achieve adequate antifriction bearing life. To achieve such higher pumping pressures, the antifriction bearings of previous pump designs have been eliminated in the radial pump of the present invention, and in their place are provided confined recesses or cavities 30 in the undersurfaces of each of the slipper bearings 12 adjacent the outer face 31 of the eccentric 10. Each such recess 30 is in communication with its associated pumping chamber 5 radially outwardly therefrom and has an area at the outer face of the eccentric substantially equal to the area of the associated plunger to achieve a hydrostatic load balance on the plungers at the eccentric face 31 regardless of the magnitude of the pressure in the pumping chambers. The load acting on the input shaft 8 through the eccentric 10 due to the hydrostatic pressure in the recesses 30 is also balanced by providing journal bearing recesses 32 in the wall of the shaft bore 9 radially opposite the plungers which have fluid communication with the associated pumping chambers 5 through separate passages 33 in the pump housing 2. Two such journal bearing recesses 32 are desirably provided for each plunger, each located equal distances from opposite sides of the plunger center lines and each having an area approximately equal to one-half the area of the associated plungers.

Figure 3:
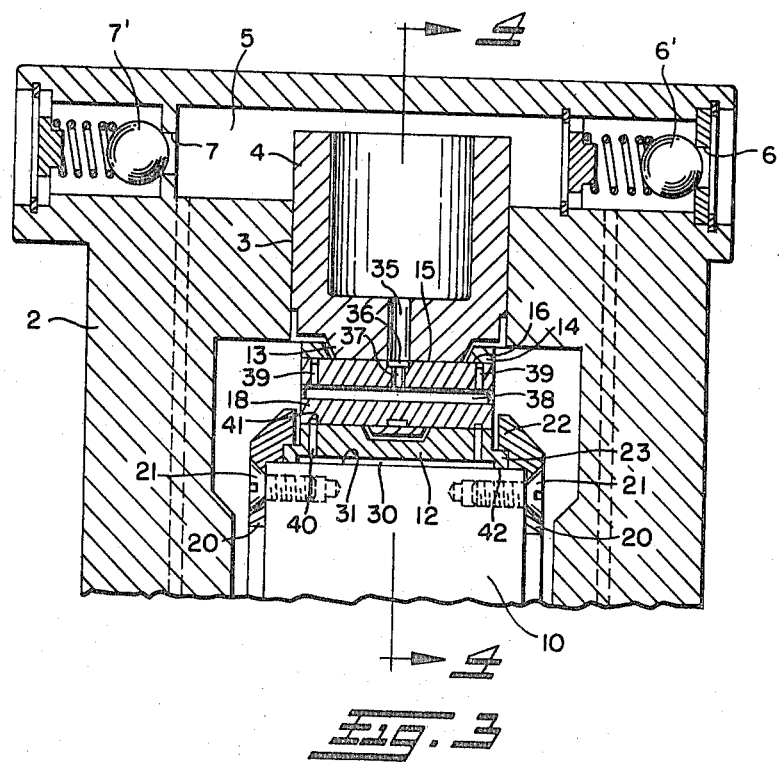
FIG. 3 is an enlargement of the upper portion of the pump shown in FIG. 2.
Figure 4:
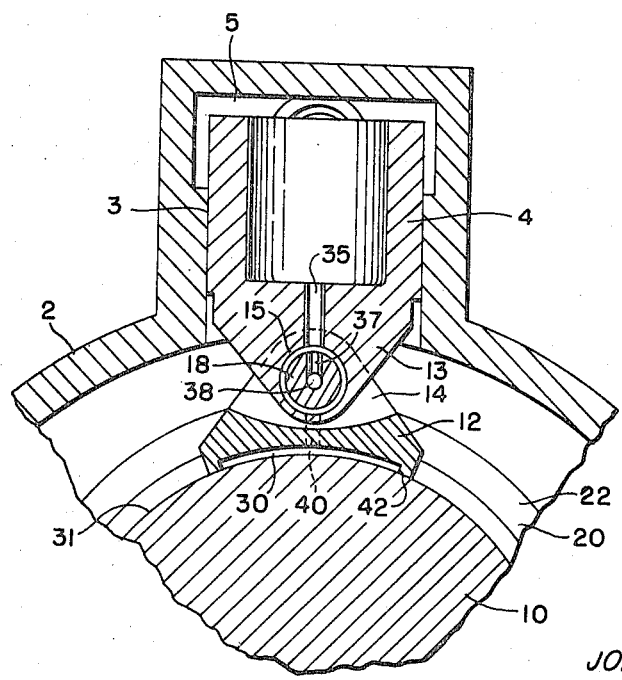
FIG. 4 is a transverse section through the pump section of FIG. 3, taken on the plane of the line 4-4.

As best seen in FIGS. 3 and 4, a radial passage 35 in each plunger 4 admits fluid from the associated pumping chamber 5 to the transverse opening 15 in the inner end 13 of such plunger for flow through an annular groove 36 in the outer wall of the pin 18 and a radial passage 37 therein. The radial passage 37 communicates with a central longitudinal passage 38 in the pin 18, for flow of such fluid through radial passages 39 in the ends of the pin 18 and radial passages 40 in each slipper bearing extending from the recess 30 to annular grooves 41 in the outer wall of such pin. To reduce fluid leakage from the recesses 30 through the slight clearance between the rim 42 of the slipper bearings and outer face 31 of the eccentric 10, the area of the recesses 30 may be made approximately 5 percent less than the area of the plungers 4 thus creating a slight overload urging the plungers and slipper bearings into close sliding engagement with the eccentric.

Because the hydrostatic load on opposite sides of the plungers 4 is substantially balanced as aforesaid, substantially all friction between the eccentric 10 and slipper bearings 12 is eliminated and the only friction loss in transferring the torque input from the eccentric 10 to the plungers is through the static fluid in the recesses 30, which is exceedingly small. Moreover, because the shaft 8 itself is hydrostatically balanced through communication of the journal bearing recesses 32 with the radially opposite pumping chambers 5 as aforesaid, the loss in mechanical input at the journal bearings is independent of pumping pressure and is dependent only on the shear of the fluid film at the recesses 32, which is also very small. Accordingly, it will be apparent that the radial pump of the present invention has a high input to output efficiency which is substantially independent of the pumping pressure. This is not the case where conventional antifriction bearings are used. Production costs of such pump are also low and the design may be made relatively lightweight and compact as compared to previous radial pump designs.

Although the principles of this invention are disclosed in connection with fluid pumps, it will be apparent that they are equally applicable to fluid motors.

I claim:

1. A radial pump comprising a housing, a radial plunger reciprocable in said housing, a drive shaft for said pump, an eccentric on said drive shaft for moving said plunger radially outwardly during a portion of each revolution of said drive shaft, means for moving said plunger radially inwardly during another portion of each such revolution of said drive shaft, a pumping chamber associated with said plunger having an inlet port through which fluid is drawn during radial movement of said plunger away from said pumping chamber and a delivery port through which such fluid is pumped from said pumping chamber during radial movement of said plunger toward said pumping chamber, and means providing a confined recess adjacent the outer face of said eccentric in radial alignment with said plunger, said recess having fluid communication with said pumping chamber for providing a load on said plunger in opposition to the load imposed on said plunger by the fluid pressure in said pumping chamber, said means providing a confined recess adjacent the outer face of said eccentric comprising a slipper bearing pivotally connected to said plunger, said slipper bearing having said recess in the undersurface thereof with the rim of said recess closely adjacent the outer face of said eccentric, said means for moving said plunger radially inwardly comprising slipper retention plates secured to opposite sides of said eccentric, said slipper retention plates having rim portions overlying shoulder portions on said slipper bearing for retaining said slipper bearing in close relation to said eccentric, said retention plates being enlarged radially opposite the outermost portion of said eccentric to provide a counterbalance for said eccentric.

2. A radial pump comprising a housing, a radial plunger reciprocable in said housing, a drive shaft extending into said housing, an eccentric on said drive shaft within said housing, a pumping chamber associated with said plunger, a slipper bearing pivotally connected to said plunger, and slipper retention plates secured to opposite ides of said eccentric, said slipper retention plates having rim portions overlying shoulder portions on said slipper bearing for retaining said slipper bearing in close relation to said eccentric, whereby rotation of said eccentric causes reciprocation of said plunger, said retention plates being enlarged radially opposite the outermost portion of said eccentric to provide a counterbalance for said eccentric.

3. A radial pump comprising a housing, a radial plunger reciprocable in said housing, a drive shaft for said pump, means for reciprocating said plunger during rotation of said drive shaft, a pumping chamber associated with said plunger having an inlet port through which fluid is drawn during radial movement of said plunger away from said pumping chamber and a delivery port through which such fluid is pumped from said pumping chamber during radial movement of said plunger toward said pumping chamber, the fluid pressure in said pumping chamber applying a load to said shaft through said plunger, said housing having an axial bore for said shaft, and a pair of recesses in the wall of said bore on opposite sides of the plunger center line radially opposite said plunger, said recesses having fluid communication with said pumping chamber, the area of said recesses being substantially equal to one-half the area of said plunger to provide a hydrostatic load on said shaft balancing the load applied to said shaft by said plunger despite variations in the pressure in said pumping chamber.

4. The pump of claim 14 wherein said means for reciprocating said plunger during rotation of said drive shaft comprises an eccentric on said drive shaft for moving said plunger radially outwardly during a portion of each revolution of said drive shaft, and means for moving said plunger radially inwardly during another portion of each such revolution of said drive shaft, and there are means providing a confined recess adjacent the outer face of said eccentric in radial alignment with said plunger, said recess having fluid communication with said pumping chamber for providing a load on said plunger in opposition to the load imposed on said plunger by the fluid pressure in said pumping chamber, said means providing a confined recess adjacent the outer face of said eccentric comprising a slipper bearing pivotally connected to said plunger, said slipper bearing having said recess in the undersurface thereof with the rim of said recess closely adjacent the outer face of said eccentric, and fluid passage means in said pump communicating said pumping chamber with said recess, the area of said recess in said slipper bearing being slightly less than the area of said plunger to provide a slight overload acting on said plunger urging said slipper bearing into close sliding engagement with said eccentric to reduce fluid leakage between the rim of said recess and said eccentric.

5. The pump of claim 4 wherein said means for moving said plunger radially inwardly comprises slipper retention plates secured to opposite sides of said eccentric, said slipper retention plates having rim portions overlying shoulder portions on said slipper bearing for retaining said slipper bearing in close relation to said eccentric.

6. The pump of claim 5 further comprising a link pin interconnecting said plunger and slipper bearing, said rim portions of said slipper retention plates extending radially beyond the ends of said link pin to retain said link pin in place.

7. The pump of claim 3 wherein there are a plurality of said circumferentially spaced radial plungers reciprocable in said housing during rotation of said shaft, plural pumping chambers for said plungers, and additional recesses in the wall of said bore radially opposite each of said plungers, said additional recesses having direct fluid communication with the radially opposite pumping chambers substantially to provide a hydrostatic load balance on said shaft.

8. The pump of claim 7 wherein there are two of said recesses for each of said plungers located on opposite sides of the plunger center lines radially opposite said plungers, the area of each of said recesses being substantially equal to one-half the area of said plungers to provide a hydrostatic load balance on said shaft.

9. A radial pump comprising a housing, a radial plunger reciprocable in said housing, a drive shaft for said pump, an eccentric on said drive shaft for moving said plunger radially outwardly during a portion of each revolution of said drive shaft, means for moving said plunger radially inwardly during another portion of each such revolution of said drive shaft, a pumping chamber associated with said plunger having an inlet port through which fluid is drawn during radial movement of said plunger away from said pumping chamber and a delivery port through which such fluid is pumped from said pumping chamber during radial movement of said plunger toward said pumping chamber, and means providing a confined recess adjacent the outer face of said eccentric in radial alignment with said plunger, said recess having fluid communication with said pumping chamber for providing a load on said plunger in opposition to the load imposed on said plunger by the fluid pressure in said pumping chamber, said means providing a confined recess adjacent the outer face of said eccentric comprising a slipper bearing pivotally connected to said plunger, said slipper bearing having said recess in the undersurface thereof with the rim of said recess closely adjacent the outer face of said eccentric, a link pin interconnecting said plunger and slipper bearing, a central longitudinal passage in said pin, aligned radial passages in said plunger and link pin communicating said pumping chamber with said central longitudinal passage in said link pin, and additional aligned radial passages in opposite ends of said link pin and slipper bearing communicating said central longitudinal passage in said link pin with said recess in said slipper bearing, said means for moving said plunger radially inwardly comprising slipper retention plates secured to opposite sides of said eccentric, said slipper retention plates having rim portions overlying shoulder portions on said slipper bearing for retaining said slipper bearing in close relation to said eccentric, said rim portions also overlying the ends of said link pin to retain said link pin in place.